United States Patent
Lee et al.

(10) Patent No.: US 11,383,324 B2
(45) Date of Patent: Jul. 12, 2022

(54) LASER WELDING METHOD BETWEEN DIFFERENT KINDS OF METALS FOR OPTIMIZING WELDING CONDITIONS THROUGH INTERMETALLIC COMPOUND ANALYSIS

(71) Applicant: LG Chem, Ltd., Seoul (KR)

(72) Inventors: Jin Soo Lee, Daejeon (KR); Sung Chul Park, Daejeon (KR); Bu Gon Shin, Daejeon (KR); Soyoung Choo, Daejeon (KR)

(73) Assignee: LG Chem, Ltd.

( * ) Notice: Subject to any disclaimer, the term of this patent is extended or adjusted under 35 U.S.C. 154(b) by 238 days.

(21) Appl. No.: 16/709,054

(22) Filed: Dec. 10, 2019

(65) Prior Publication Data
US 2020/0108462 A1    Apr. 9, 2020

Related U.S. Application Data

(63) Continuation of application No. PCT/KR2018/010578, filed on Sep. 11, 2018.

(30) Foreign Application Priority Data

Sep. 11, 2017    (KR) .................. 10-2017-0116056

(51) Int. Cl.
*B23K 26/323*    (2014.01)
*B23K 11/20*    (2006.01)
(Continued)

(52) U.S. Cl.
CPC ............ *B23K 26/323* (2015.10); *B23K 26/21* (2015.10); *G01N 23/203* (2013.01); *G01N 23/20058* (2013.01)

(58) Field of Classification Search
CPC . B23K 26/323; B23K 2103/18; B23K 26/244
See application file for complete search history.

(56) References Cited

U.S. PATENT DOCUMENTS 10,144,091 B2    12/2018    Sakurada et al.
10,173,281 B2 *    1/2019    Sakurai ................ B23K 26/323
(Continued)

FOREIGN PATENT DOCUMENTS

CA    2879175 A1    1/2014
CN    103495804 A    1/2014
(Continued)

OTHER PUBLICATIONS

International Search Report for Application No. PCT/KR2018/010578 dated Jan. 28, 2019.
(Continued)

*Primary Examiner* — Jimmy Chou
*Assistant Examiner* — Lawrence H Samuels
(74) *Attorney, Agent, or Firm* — Lerner, David, Littenberg, Krumholz & Mentlik, LLP

(57) ABSTRACT

A method of optimizing laser welding of two different metals is disclosed herein. In some embodiments, a method for optimizing laser welding of two different metals comprising laser welding a plurality of samples comprising a first metal and a second metal to form a weld between the first metal and the second metal, the weld having a molten area, wherein each sample is laser welded using a different line energy, measuring the content of an intermetallic compound produced by the laser welding in the molten area of the weld in each sample, and determining the line energy of the laser that results in the content of the intermetallic compound produced in the molten area of the weld being less than 10%.

10 Claims, 5 Drawing Sheets
(5 of 5 Drawing Sheet(s) Filed in Color)

(51) Int. Cl.
*B23K 26/21* (2014.01)
*G01N 23/20058* (2018.01)
*G01N 23/203* (2006.01)

(56) References Cited

U.S. PATENT DOCUMENTS

| | | | |
|---|---|---|---|
| 10,350,702 | B2 | 7/2019 | Lee et al. |
| 10,439,191 | B2* | 10/2019 | Kumazawa .......... B23K 35/302 |
| 2011/0123825 | A1* | 5/2011 | Sakurai ................ B23K 11/115 |
| | | | 428/650 |
| 2014/0008335 | A1 | 1/2014 | Yao et al. |
| 2016/0031044 | A1 | 2/2016 | Marino et al. |
| 2016/0114429 | A1* | 4/2016 | Shioga ................ H01M 50/502 |
| | | | 219/121.66 |
| 2017/0173719 | A1 | 6/2017 | Nguyen et al. |
| 2018/0026252 | A1* | 1/2018 | Kumazawa ............... C22C 9/01 |
| | | | 429/121 |
| 2018/0245616 | A1 | 8/2018 | Kumazawa et al. |
| 2019/0217410 | A1 | 7/2019 | Nguyen |

FOREIGN PATENT DOCUMENTS

| | | |
|---|---|---|
| CN | 103753005 A | 4/2014 |
| CN | 104679995 A | 6/2015 |
| CN | 105033459 A | 11/2015 |
| EP | 2878410 A1 | 6/2015 |
| JP | 2001181766 A | 7/2001 |
| JP | 2006024451 A | 1/2006 |
| JP | 2006035285 A | 2/2006 |
| JP | 2006130541 A | 5/2006 |
| JP | 2011005499 A | 1/2011 |
| JP | 2011125889 A | 6/2011 |
| JP | 2015211981 A | 11/2015 |
| JP | 2017080791 A | 5/2017 |
| KR | 20150007242 A | 1/2015 |
| KR | 20150034754 A | 4/2015 |
| KR | 20160016709 A | 2/2016 |
| KR | 101683044 B1 | 12/2016 |
| KR | 20170058702 A | 5/2017 |
| WO | 2017047050 A1 | 3/2017 |

OTHER PUBLICATIONS

Wei et al., "Investigation of interdiffusion and intermetallic compounds in Al—Cu joint produced by continuous drive friction welding", Engineering Science and Technology, an International Journal, Accepted May 27, 2015, vol. 19, No. 1, pp. 90-95.
"Encyclopedia of Metallurgy in China-Metallic Materials," Editorial Committee of Encyclopedia of Metallurgy in China, Mar. 2001, p. 690, Metallurgical Industry Press.
Chinese Search Report for Application No. 201880027605.6 dated Nov. 4, 2020, 3 pages.
Zhou et al., Fundamentals of Mechanical Manufacturing Industry, Huazhong University of Science and Technology Press, Oct. 2005, pp. 136-137.

* cited by examiner

[FIG. 1]
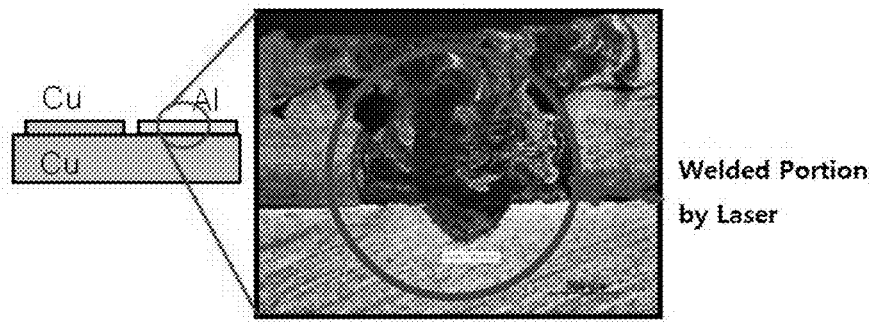
[FIG. 2]
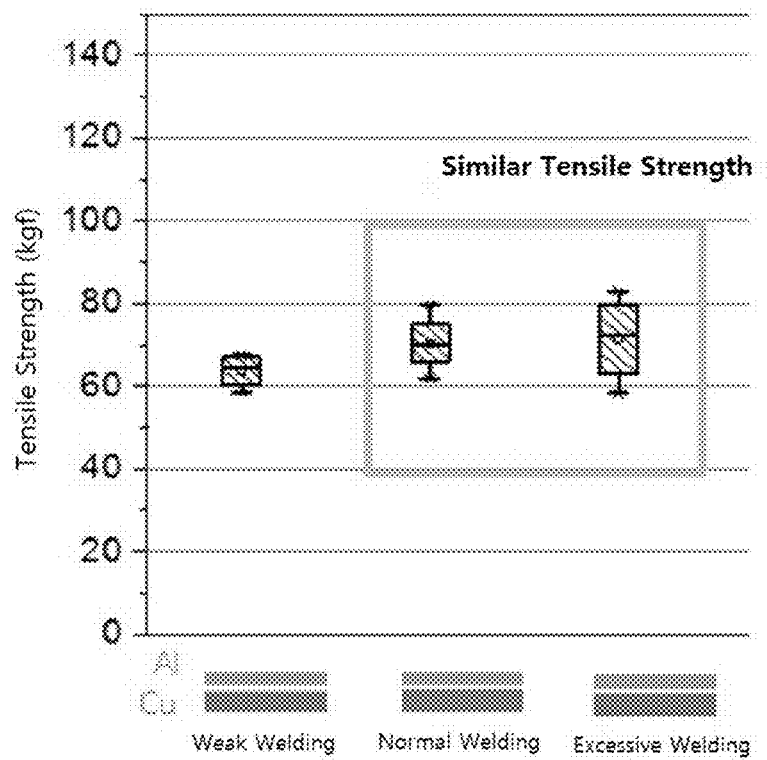

[FIG. 3]
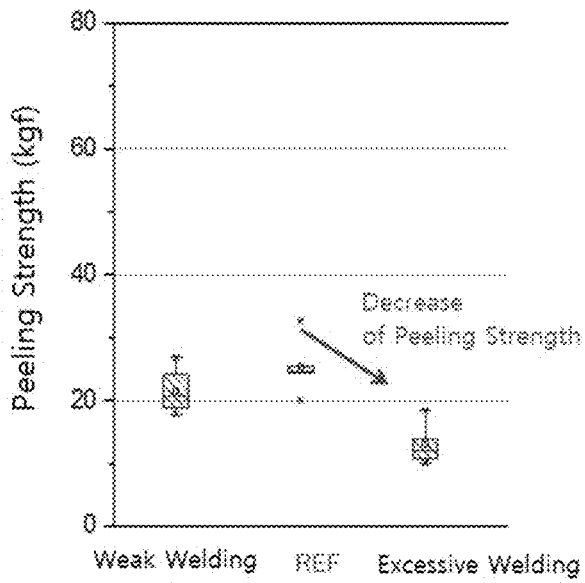
[FIG. 4]
| Kind of Phase | Normal Welding, IMC Content (%) | Excessive Welding, IMC Content (%) |
|---|---|---|
| Al Cu(2/1) | 0.401 | 27.888 |
| Al Cu(3/2) | 0.244 | 3.686 |
| Al Cu(4/9) | 0.201 | 0.272 |
| Al Cu(9/11.5) | 0.229 | 0.909 |
| Al Cu(1/1) | 0.392 | 2.123 |
| Al Cu(1/3_β) | 0.165 | -- |
| Al Cu(1/3_γ) | 0.442 | 0.497 |
| Zero Solution | 11.542 | 31.325 |
| IMC Content in Welded Portion | 13.616 | 66.9 |
| EBSD Mapping Image | | |

[FIG. 5]
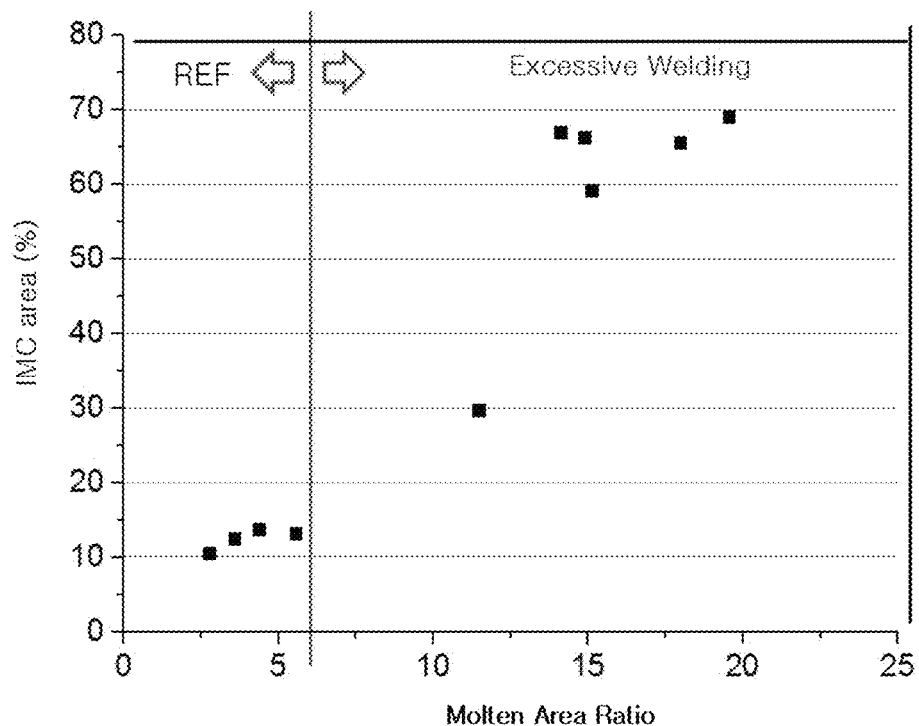
[FIG. 6A]
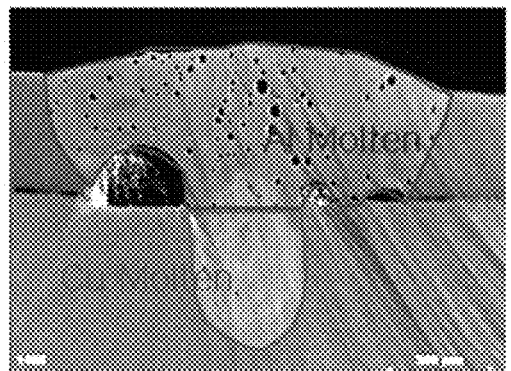

[FIG. 6B]
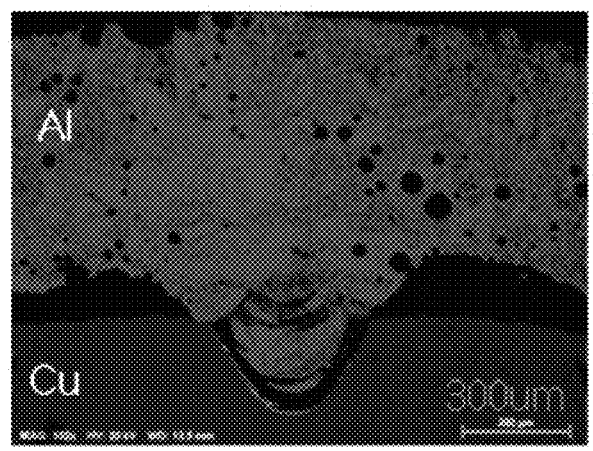
Ratio ≒ 5%
[FIG. 6C]
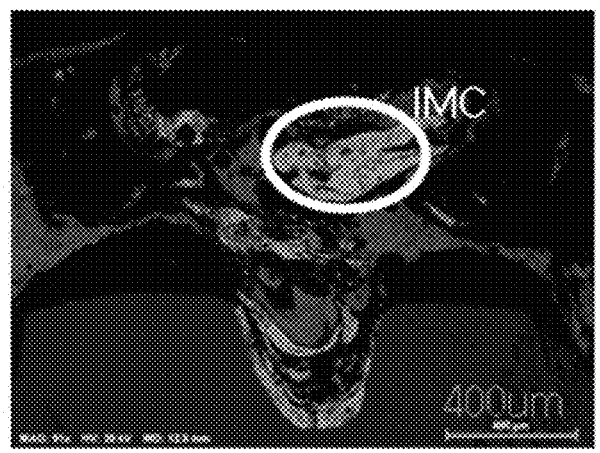
Ratio ≒ 10%

[FIG. 6D]
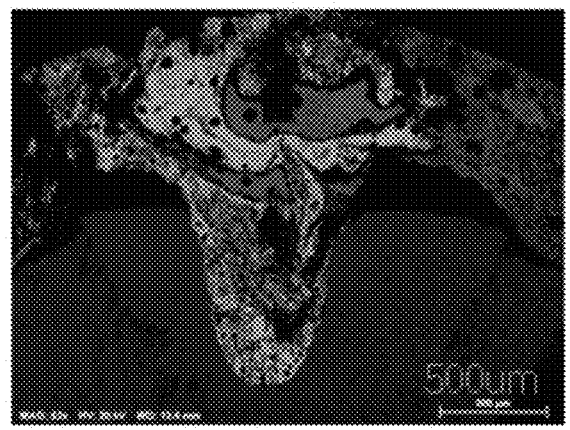

LASER WELDING METHOD BETWEEN DIFFERENT KINDS OF METALS FOR OPTIMIZING WELDING CONDITIONS THROUGH INTERMETALLIC COMPOUND ANALYSIS

CROSS-REFERENCE TO RELATED APPLICATION(S)

The present application is a continuation of International Application No. PCT/KR2018/010578, filed on Sep. 11, 2018, which claims priority from Korean Patent Application No. 10-2017-0116056, filed on Sep. 11, 2017, the entire disclosures of which are incorporated by reference herein.

TECHNICAL FIELD

The present invention relates to a method for laser welding of different metals which can optimize welding conditions by using intermetallic compound analysis.

BACKGROUND ART

Aluminum (Al) members and copper (Cu) members are widely used in electronic and electrical parts and heat dissipation parts in that they have excellent electrical conductivity and thermal conductivity.

Particularly, the copper members are superior in terms of electrical conductivity and thermal conductivity, and have high mechanical strength and large resistance to deformation. The aluminum members have somewhat lower electrical conductivity and thermal conductivity than copper, but they are light in weight and less resistant to deformation. For this reason, copper and aluminum members are used depending on required performances of the electronic and electrical parts and heat dissipation parts. On the other hand, in the preparation of a battery comprising a cathode and an anode, the cathode and the anode are required to have junction for electrical connection between cells. In general, hetero-junction methods using aluminum, copper and other members are widely used. Also, a junction of copper and aluminum members is recently required for the purpose of downsizing and lightening the electronic and electrical parts and heat-dissipating parts.

However, aluminum and copper produce several intermetallic compounds due to their different melting temperature on laser welding for their junction. FIG. 1 shows an optical microscope image observing a laser welded cross-section of a copper bus bar and an aluminum lead. When the aluminum member and the copper member are directly welded, a large amount of intermetallic compound is randomly produced in the welded portion (junction interface) as shown in FIG. 1. The quantity or type of intermetallic compound to be produced may be different depending on welding methods and conditions. The intermetallic compound thus formed has a higher electric resistance and hardness than the parent material (base metal), which may adversely affect the mechanical properties of the welded portion such as brittleness or deteriorate the electrical connection between the cells due to the increased resistance. Therefore, there is a need for a technique capable of sufficiently securing the bonding reliability of the intermetallic compound.

DETAILED DESCRIPTION OF THE INVENTION

Technical Problem

It is necessary to find a method of distribution analysis and quantization of an intermetallic compound (IMC) produced in a welded portion by laser to secure the reliability of welding quality.

Accordingly, it is an object of the present invention to provide a method for confirming optimum conditions of laser welding by distribution analysis and quantification of intermetallic compound to secure the reliability of a welded portion on laser welding for different metals.

Technical Solution

In order to accomplish the object, the present provides a method for optimizing laser welding of different metals, comprising laser welding a plurality of samples comprising a first metal and a second metal to form a welded portion between the first metal and the second metal, wherein each sample is laser welded using a different laser energy, measuring the content of an intermetallic compound produced by the laser welding in the molten area of the weld in each sample, calculating a molten area ratio between the first metal and the second metal in the welded portion, wherein a molten area of the first metal being less than a molten area of the second metal in the welded portion, and determining the laser energy that results in the molten area ratio being a predetermined value to minimize the content of the intermetallic compound in the welded portion.

In a preferred embodiment, the molten area ratio is defined by the following Equation and it may be less than 10%.

Molten area Ratio=(the molten area of the first metal/the molten area of the second metal)×100

In a preferred embodiment, the method may further comprise measuring a tensile strength of the welded portion in each sample to determine the strength of the weld in each sample. In a preferred embodiment, the method may pre-determining whether the welded portion is weakly welded by measuring the tensile strength of the welded portion.

Also, the measurement of the intermetallic compound content may comprise (a) a step of performing an X-ray diffraction (XRD) analysis on the welded portion to identify the existence and nonexistence of newly formed intermetallic compound and the type thereof; (b) a step of performing an electron backscatter diffraction (EBSD) analysis on the welded portion to obtain Kikuchi bands and mapping the bands over the welded portion; and (c) a step of matching the intermetallic compound identified by X-ray diffraction analysis and the information indicated by the Kikuchi band to confirm the distribution of the intermetallic compound and the content of the intermetallic compound in the welded portion.

In a preferred embodiment of the present invention, the intermetallic compound may be a plurality of intermetallic compounds due to the difference of the melting temperatures among the different metals on laser welding thereof.

The intermetallic compound may be selected from the group consisting of aluminum (Al)-copper (Cu) compounds and aluminum (Al)-nickel (Ni) compounds, preferably it may comprise at least one selected from the group consisting of $Al_2Cu$, $AlCu$, $Al_3Cu_4$, $Al_2Cu_3$, $Al_4Cu_9$, $Al_3Cu_2$, $AlCu_3$ and $Al_9Cu_{11.5}$.

Advantageous Effects

The present invention can provide optimum conditions of laser welding by using distribution and quantification analysis for phases of an intermetallic compound produced in a laser-welded portion, which allows feed-back for laser welding design and process. Methods of different metals and minimizing the intermetallic compound, thereby securing the mechanical and electrical reliability of the welded portion.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1 shows an optical microscope image observing a cross-section of a laser welded portion between copper bus bar and aluminum lead.

FIG. 2 is a graph showing tensile strength measured for a welded portion.

FIG. 3 is a graph showing peeling strength measured for a welded portion.

FIG. 4 shows the content of intermetallic compound (IMC) and the EBSD mapping image according to the normal welding and excessive welding in FIG. 2.

FIG. 5 is a graph showing the relationship of the IMC area and the metal-molten area ratio.

FIG. 6A is a SEM image showing a method for measuring metal-molten area.

FIGS. 6B to 6D are EBSD images showing the metal-molten area ratio obtained thereby.

BEST MODE

Hereinafter, the present invention will be described in detail. The following specification is intended to be illustrative of the present invention and not to be construed as limiting the scope of the invention.

The present invention relates to a method for optimizing laser welding of different metals, comprising laser welding a plurality of samples comprising a first metal and a second metal to form a welded portion between the first metal and the second metal, wherein each sample is laser welded using a different laser energy, measuring the content of an intermetallic compound produced by the laser welding in the welded portion in each sample, calculating a molten area ratio for the first metal and the second metal in the welded portion, wherein a molten area of the first metal being less than a molten area of the second metal in the welded portion, and determining the laser energy of the laser that results in the molten area ratio being a predetermined value to minimize the contents of the intermetallic compound in the welded portion.

The intermetallic compound refers to one or more materials comprising combinations of the first and second metals formed on laser welding due to the difference between the melting temperatures and cooling rates of different metals. According to a preferred embodiment of the present invention, the intermetallic compound may be selected from the group consisting of aluminum (Al)-copper (Cu) compounds and aluminum (Al)-nickel (Ni) compounds, preferably it may comprise at least one selected from the group consisting of $Al_2Cu$, $AlCu$, $Al_3Cu_4$, $Al_2Cu_3$, $Al_4Cu_9$, $Al_3Cu_2$, $AlCu_3$ and $Al_9Cu_{11.5}$.

In a preferred embodiment, the molten area ratio is defined by the following Equation.

Molten area Ratio=(the molten area of the first metal/the molten area of the second metal)×100

The molten area ratio may be controlled to less than 10%, 8% or less, or 6% or less. Also, the molten area ratio of more than 0% refers that both of the parent materials are molten and welded.

In a preferred embodiment, the method may further comprise pre-determining whether the welded portion is weakly welded by measuring tensile strength of the welded portion. The basis of the weak-welding may vary depending on kinds or uses of metals, and thus it may be properly established as needed.

Conventionally, welding degree between different metals has been confirmed by measuring the tensile strength of a welded part. As shown in FIG. 2, weak welding may be confirmed by the tensile strength, but excessive welding is difficult to be distinguished from normal welding. The excessive welding raises the content of the intermetallic compound (IMC) to adversely affect long-term reliability. The IMC is susceptible to galvanic corrosion and moisture, and the continuous exposure of the IMC to such an atmosphere widens the area thereof and generate cracks and holes, thereby deteriorating welding reliability.

In the present invention, the contents of the intermetallic compound in a normal welded portion and an excessively welded portion are analyzed, and as a result, it is confirmed that the content ratios of the intermetallic compound between the two welded portions are different from each other as shown in FIG. 4.

The analysis for the content of the intermetallic compound is performed by using electron backscatter diffraction (EBSD) and X-ray diffraction (XRD) capable of determining the distribution and quantity of the intermetallic compound, which is disclosed in Korean Patent Application No. 2015-0162633 and the entire disclosure thereof is incorporated herein by reference.

That is, the measurement of the intermetallic compound content may comprise (a) a step of performing an X-ray diffraction (XRD) analysis on the welded portion to identify the presence or absence of newly formed intermetallic compound and the type thereof; (b) a step of performing an electron backscatter diffraction (EBSD) analysis on the welded portion to obtain Kikuchi bands and mapping the bands for the welded portion; and (c) a step of matching the intermetallic compound identified by the X-ray diffraction analysis and the information indicated by the Kikuchi band to determine the distribution of the intermetallic compound and the content of the intermetallic compound in the welded portion.

First, in the step (a), the welded portion is analyzed by the X-ray diffraction (XRD) to identify the existence of a newly formed intermetallic compound and the type of the newly formed intermetallic compound. The XRD is a well-known technique for studying the crystal structure of materials. In the XRD, a sample is irradiated by a monochromatic X-ray beam, and the position and intensity of the diffraction peak are measured. The specific scattering angle and scattered intensity depend on the lattice plane of the sample to be analyzed and atoms occupying the plane. For a given wavelength ($\lambda$) and lattice plane distance (d), the diffraction peak is observed when the X-ray is incident onto the lattice plane at an angle ($\theta$) that satisfies the Bragg condition, $n\lambda=2d \sin \theta$, wherein n is the scattering order. The angle ($\theta$) satisfying the Bragg condition is known as the Bragg angle. Distortions in the lattice plane due to stress, solid, solvent or other consequences are observable changes in the XRD spectrum. The XRD has been used to measure the properties of a crystalline layer produced on a semiconductor wafer.

In the step (a), when the welded portion is analyzed by the XRD, a diffraction peak of the crystal plane may be obtained by a micro-diffraction measurement method using a 2-dimensional detector. For example, a welded portion formed from first and second metals consisting of copper and aluminum is analyzed by the XRD, a total 4 materials, i.e., $Al_2Cu$, $Al_4Cu_9$, Al and Cu may be detected, from which the presence or absence of newly formed intermetallic compounds, e.g., $Al_2Cu$ and $Al_4Cu_9$, and the types thereof can be confirmed.

Subsequently, in the step (b), an Electron backscatter diffraction (EBSD) analysis is performed on the welded portion to obtain Kikuchi bands and mapping the bands for the welded portion.

EBSD is an analyzer for studying the crystallographic structure of a material, which is based on SEM or FIB. That is, EBSD is an accessory to be equipped into SEM or FIB, together with EDS. In case EBSD is installed together with EDS in SEM or FIB, simultaneous mapping of crystal orientations and chemical compositions is possible. More specifically, by using EBSD, the accelerated electrons of SEM or FIB are diffracted in a crystal specimen to form Kikuchi bands or electron back scattered patterns according to crystal orientation on a phosphor screen, and the formed bands or patterns are used to analyze the crystallographic characteristics (crystal orientation and crystal grain size, etc.) of the sample.

The Kikuchi patterns occur when an incident electron beam loses very small energy due to an inelastic collision and is subject to diffraction again, and the patterns are used in crystal orientation analysis. Similar to XRD, although it is not possible to measure the overall orientation distribution of the crystal grains in a specimen at one time, their mapping function is very useful because it can provide the orientation distribution of all crystal grains in the SEM observation region. The measured patterns are determined to be the most similar value by using the database related to the crystal structure of materials. In addition, the crystal orientation and chemical composition can be simultaneously mapped when installed together with EDS. If it is difficult to distinguish phases by the crystal orientation and crystal structure, EDS measurement information may be used for easy classification. In addition, the SEM image is used to confirm the shape of the sample, and the mapping information of EBSD appears on the SEM image. On the other hand, the mapping of the whole image means matching each Kikuchi pattern expressed in a pixel unit with a crystal structure database to represent the result thereof on the SEM image.

Next, in the step (c), the intermetallic compound identified by X-ray diffraction analysis and the information indicated by the Kikuchi band are matched to determine the distribution of the intermetallic compound and the content of the intermetallic compound in the welded portion. When there is a crystal structure database of a similar Kikuchi pattern at the measurement position, the database may be matched with the XRD result values for the selection of the accurate crystal structure, thereby improving the analysis reliability.

FIG. 5 is a graph showing the relationship of the IMC area and metal-molten area ratio, and FIG. 6A is an SEM image and FIGS. 6B-6D are EBSD images showing the measuring method of the metal-molten area and the metal-molten area ratio.

In the graph of FIG. 5, the y-axis represents the content (%) of the intermetallic compound, and the x-axis represents the molten area of each of the welded different metals with the ratio. FIG. 5 shows the case that copper and aluminum are welded, and the molten area ratio is a value obtained by the Equation [molten area of Cu/molten area of Al]×100. FIGS. 6A to 6D show a method of measuring each areas of the molten portion of Cu and the molten portion of Al from a SEM image and the EBSD images for various ratios.

According to the results shown in FIG. 5, it can be seen that excessive welding occurs when the area ratio is 10% or more. Thus, the preferred area ratio is less than 10%, less than 8%, less than about 6%, or less than 5.57%.

Hereinafter, the present invention will be described in more detail with reference to Examples. It will be apparent to those skilled in the art that the following examples are intended to be illustrative of the present invention and not to be construed as limiting the scope of the invention.

Example

1. Intermetallic compounds were prepared by laser welding aluminum and copper. The laser welding was performed by IPG 2 kw fiber laser where the line energy (=output/speed) was changed to 7.5, 10, and 12.5 J/mm, thereby preparing three samples of weak welding (about 4%), normal welding (about 8%) and excessive welding (about 12%).

2. The three samples prepared were measured for their tensile strength at 10 mm/min using a Universal Tensile Strength Tester (J1-106). The results thereof were shown in FIG. 2. Also, the three samples were measured for their peeling strength using the same tester, and the results thereof are shown in FIG. 3. As can be seen from FIGS. 2 and 3, the tensile strength of the excessive welding is similar to that of normal welding, but the peeling strength thereof was rapidly reduced. That is, it may be easily peeled off even with a small force.

3. The intermetallic compound was analyzed by an XRD instrument under the following conditions, and the presence or absence of newly formed phase and the kind thereof were confirmed.

The instrument and analysis conditions of the XRD: After mounting the sample with a double-faced tape using a suitable sample holder, the x, y, and z-drives of Bruker AXS D8 Discover XRD (voltage: 50 kV, current: 1000 µA, Cu Kα radiation wavelength: 1.54 Å) were properly moved so that the laser beam is irradiated onto the measurement site, then a coupled θ-2θ measurement mode was applied to set a theta 12.5 degree detector (VANTEC-500: 2-D detector) at 25 degrees, thereby measuring 3 frames at 25 degrees interval (for 1,200 seconds per each frame).

4. The intermetallic compound was analyzed by EBSD under the following conditions to obtain the Kikuchi band (measurement condition: 30 kev, measurement area: about 1,000,000 µm² which may be adjusted according to the magnification of SEM), measurement pixel size: 0.2~1.5 µm (adjustable).

5. The measurement results of XRD and EBSD were matched for analysis, and the results thereof were shown in FIG. 4. The '%' means a percentage based on the number of pixels represented by the corresponding phases in the whole image. FIG. 4 shows the percentage of the measured area based on the phase-mapping for normal welding and excessive welding samples. In FIG. 4, for example, AlCu (2/1) indicates the atomic ratio of Al2Cu1. Also, AlCu (1/3_β) and AlCu (1/3_γ) have similar atomic ratios but their phases formed are different. The zero solution represents the case that there is no phase or two or more phases within the beam size of the FIB.

6. In order to change in molten area of Cu and Al, the line energy was changed to 10 J/mm (5%), 11.5 J/mm (10%), and 12.5 J/mm (20%) to prepare a sample, followed by performing. The images of EBSD according to the metal-molten area were shown in FIGS. 6C to 6D.

According to the above results, it can be confirmed that the production of intermetallic compounds can be reduced by controlling the ratio of the area of the molten portion during the laser welding of different metals to a predetermined level or less. As a result, it allows feed-back for laser welding designs and methods of different metals and can minimize the intermetallic compound, thereby securing the mechanical and electrical reliability of the welded portion.

What is claimed is:

1. A method for optimizing laser welding of different metals, comprising: laser welding a plurality of samples comprising a first metal and a second metal to form a welded portion between the first metal and the second metal, wherein each sample is laser welded using a different laser energy, and wherein the welded portion includes a molten area in the first metal and a molten area in the second metal;
measuring the content of an intermetallic compound produced by the laser welding in the welded portion in each sample;
calculating a molten area ratio for the first metal and the second metal in the welded portion in each sample, wherein the molten area in the first metal being less than a molten area in the second metal; and
determining, from the measured content of intermetallic compound and the calculated molten area ratios in the plurality of samples, the laser energy that results in the molten area ratio being within a predetermined range of values to minimize the contents of the intermetallic compound in the welded portion.

2. The method according to claim 1, wherein the molten area ratio is defined by the following Equation Molten area Ratio=(the molten area in the first metal/the molten area in second metal) ×100.

3. The method according to claim 1, further comprises:
measuring a tensile strength of the welded portion in each sample to determine the strength of the weld in each sample.

4. The method according to claim 1, wherein measuring the content of the intermetallic compound comprises:
performing X-ray diffraction (XRD) analysis to identify the intermetallic compound present in the welded portion;
performing an electron backscatter diffraction (EBSD) analysis on the welded portion to obtain Kikuchi bands and mapping the bands over the welded portion; and
matching the intermetallic compound identified by X-Ray diffraction analysis and the information indicated by the Kikuchi bands to determine the distribution of the intermetallic compound and the content of the intermetallic compound in the welded portion.

5. The method according to claim 1, wherein the intermetallic compound is a plurality of intermetallic compounds due to the difference between melting points of the first and second metals on laser welding thereof.

6. The method according to claim 1, wherein the intermetallic compound is selected from the group consisting of aluminum (Al)-copper (Cu) compounds and aluminum (Al)-nickel (Ni) compounds.

7. The method according to claim 1, wherein the intermetallic compound comprises at least one selected from the group consisting of $Al_2Cu$, $AlCu$, $Al_3Cu_4$, $Al_2Cu_3$, $Al_4Cu_9$, $Al_3Cu_2$, $AlCu_3$ and $Al_9Cu_{11.5}$.

8. The method according to claim 2, wherein the molten area ratio is less than 10%.

9. The method according to claim 2, wherein the molten area ratio is less than about 5.57%.

10. The method according to claim 2, wherein the molten area ratio is less than 10%.

* * * * *